United States Patent [19]
Weman

[11] 3,873,042
[45] Mar. 25, 1975

[54] SAFETY BELT LOCKING WITH CONICAL INERTIA MEMBER

[75] Inventor: Per Olaf Weman, Haslah, Germany

[73] Assignee: Sigmatex, A.G., Basel, Switzerland

[22] Filed: Jan. 7, 1974

[21] Appl. No.: 431,514

[52] U.S. Cl. .......................................... 242/107.4
[51] Int. Cl. ...................... A62b 35/02, B65h 75/48
[58] Field of Search ................... 242/107.4, 107 SB; 280/150 SB; 297/388

[56] References Cited
UNITED STATES PATENTS

| | | | |
|---|---|---|---|
| 3,430,891 | 3/1969 | Burleigh | 242/107.4 |
| 3,741,494 | 6/1973 | Fiala | 242/107.4 |
| 3,758,044 | 9/1973 | Nilsson | 242/107.4 |
| 3,770,224 | 11/1973 | Hayashi | 242/107.4 |

Primary Examiner—John W. Huckert
Assistant Examiner—John M. Jillions
Attorney, Agent, or Firm—John P. Kirby, Jr.

[57] ABSTRACT

The locking mechanism is operated by inertia and prevents withdrawal of a vehicle safety belt from its retractor when the locking mechanism is subjected to a predetermined acceleration or deceleration or a sudden change in orientation or direction of movement. The locking mechanism is vehicle sensitive and uses a substantially conical inertia member, mounted on a plurality of balls which are disposed on a retaining platform. A substantially conical actuating member having an open bottom is disposed over the inertia member. A locking dog is affixed to the substantially conical member. The inertia member is adapted to be disposed in a rest position in the approximate center of the retaining platform and is adapted to be displaced from the rest position by inertia to an engaged position at or near the periphery of the retaining platform, causing the locking dog to engage a ratchet wheel connected to the safety belt reel to restrain the safety belt against withdrawal.

8 Claims, 5 Drawing Figures

SAFETY BELT LOCKING WITH CONICAL INERTIA MEMBER

BACKGROUND OF THE INVENTION

This invention relates to safety belts and is adapted for incorporation in a retractor for a safety belt. Such a retractor mechanism may be mounted on the floor or on the frame of a vehicle or craft for use by the occupants of the vehicle or craft. Such vehicles or crafts include automobiles, trucks, buses, railroad trains, aircraft and marine craft. More particularly, this invention relates to an improved locking mechanism which is adapted to be placed in operation automatically when a dangerous situation arises, such as a collision. Still more particularly, this invention relates to a vehicle sensitive locking mechanism operated by inertia and adapted to lock the retractor against withdrawal of the safety belt when the vehicle or craft is subjected to a predetermined deceleration or acceleration or to a sudden change in orientation or direction of movement, such as occurs in dangerous situations, such as a collision.

Recently designed automobile safety seat belts are normally wound on a reel and are equipped with a retractor. When the seat belt is in use under normal conditions, not under emergency condition, it is possible for the seat belt wearer to move in his seat, for example, to lean forward. As the wearer leans forward, the belt is unwound from the reel, and as the wearer leans back, the belt is retracted and rewound on the reel. In an emergency it is desirable to lock the reel so that it will not allow the belt to be unwound, but, rather, will hold the wearer firmly in his seat.

Other locking mechanisms for a safety belt are known in the prior art, including locking mechanisms operated by inertia, such as the locking mechanism disclosed in U.S. patent application Ser. No. 382,971 of P. O. Weman, filed July 26, 1973 and U.S. patent application Ser. No. 409,566 of Dornis Levasseur, filed Oct. 25, 1973. Additional locking mechanisms are disclosed in U.S. Pat. Nos. 3,741,494 to Fiala; 3,237,729 to Proctor; 3,420,891 to Burleigh; 3,343,763 to Spouge and 3,343,765 to Baker; all of which disclose mono-stable mechanisms.

SUMMARY OF THE INVENTION

The locking mechanism of this invention includes: a substantially conical inertia member; a retaining platform for this inertia member on which the inertia member is supported; a substantially conical actuating member disposed above the inertia member; and a locking dog affixed to the actuating member. Displacement of the inertia member causes the locking dog to engage a ratchet wheel which is mounted on a reel and thus restrains the safety balt against movement in the withdrawal direction. The actuating member has the approximate shape of a wide angled cone with an open bottom and the inertia member has the approximate shape of a closed cone. The actuating member is disposed above the inertia member and the inertia member fits partially within the actuating member. The inertia member is adapted to be disposed in a central position with reference to the retaining base when the locking mechanism is not in operation and is adapted to be displaced from the central position by inertia to actuate the locking mechanism. The inertia member has an apex and a base. The inertia member has a plurality of recesses in its base and a plurality of balls which are rotatably positioned in the recesses. As a result of sudden acceleration, deceleration of a change in orientation or direction of movement in the vehicle, the inertia member rolls on the retaining platform by means of the balls and moves the actuating member and the locking dog thereabove to actuate the locking mechanism.

DETAILED DESCRIPTION

Figure 1:
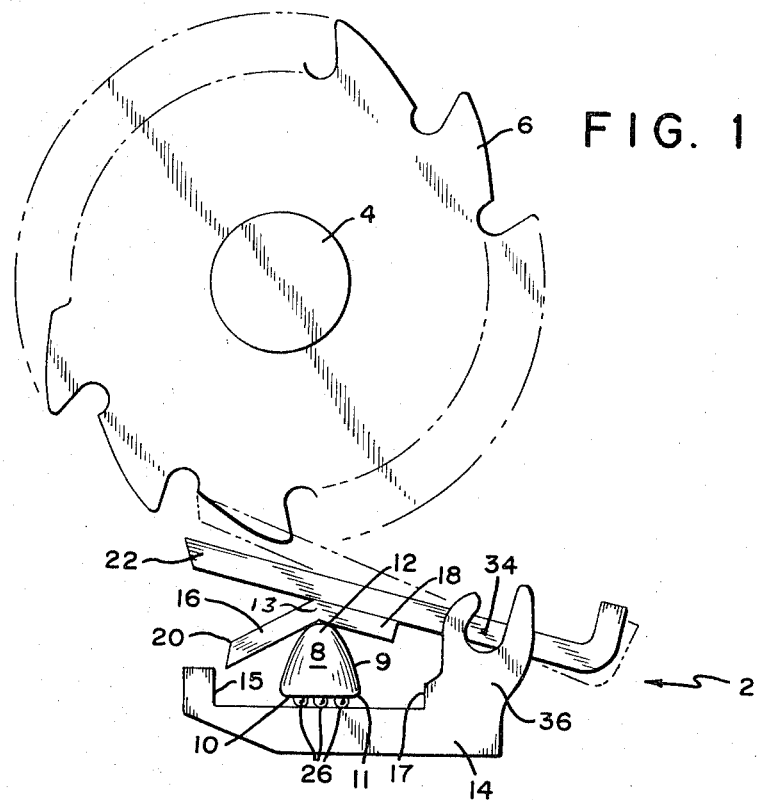
FIG. 1 is a schematic illustration of the locking mechanism of this invention in its rest position.
Figure 2:
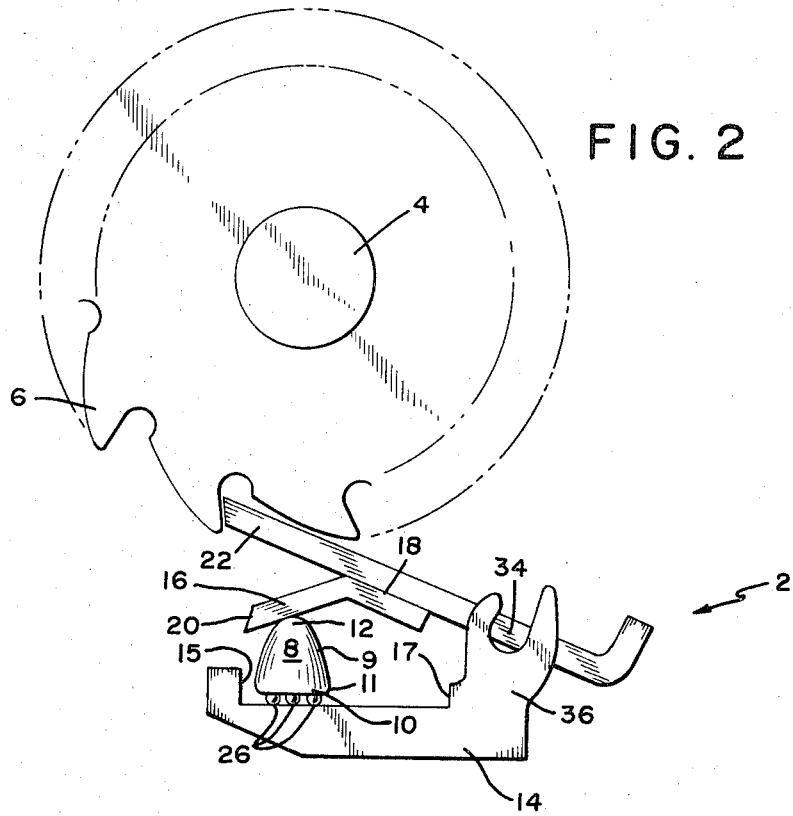
FIG. 2 is a schematic illustration of the locking mechanism of FIG. 1 in its engaged position.

Referring to FIGS. 1 and 2, the locking mechanism of this invention is generally indicated by the numeral 2 and is adapted for use with one or more safety belts, such as those used in automobiles and other vehicles. The locking mechanism 2 is adapted for use with safety belts of the type which are wound around a reel 4. The reel 4 has one or more ratchet wheels 6 which may be axially mounted on the reel 4 as part of the retractor.

A safety belt having such a reel and ratchet wheel is described in U.S. Pat. No. 3,343,765 to A. R. Baker and in U.S. Pat. No. 3,266,053 to J. W. L. Petty. The locking mechanism 2 of this invention may be described as being "vehicle sensitive" because it is sensitive to acceleration, deceleration, or change in direction of movement or orientation of the vehicle in which the retractor and locking mechanism 2 are mounted.

The locking mechanism 2 is provided with: a substantially conical inertia member 8; a circular retaining platform 14; a substantially conical actuating member 16; and a locking dog 22.

The inertia member 8 has a base 10, a rounded apex 12, curved sides 9 and round edges 11 where the sides 9 meet the base 10. The inertia member is adapted to be disposed in a central position with reference to the retaining platform 14, as shown in FIG. 1, when the locking mechanism is not in operation. The inertia member 8 is adapted to be displaced from the central position by inertia, as shown in FIG. 2, when the locking mechanism 2 is placed in operation. The circular retaining platform 14 is a substantially flat plane having upturned sides 15 and 17. The inertia member 8 is supported on the retaining platform 14. When the locking mechanism 2 is not in operation, the retaining platform 14 is substantially horizontal. The actuating member 16 is disposed over the inertia member 8, in contact with the inertia member 8, as shown in FIG. 1. The locking dog 22 is affixed to the actuating member 16. Inertia or tilting of the retaining platform 14 causes displacement of the inertia member 8 from its central position. This displacement causes movement of the actuating member 16 and the locking dog 22, causing the locking dog 22 to engage the ratchet wheel 6 and restrain the safety belt against movement in the withdrawal direction. Although both the inertia member 8 and the actuating member 16 have a substantially conical shape, the angle formed by the sides of the actuating member 16 with its apex 13 is greater than the angle formed by the sides of the inertia member 8 at its apex 12. The actuating member 16 has an open bottom while the inertia member 8 has a closed base 10. As a result, the inertia member 8 fits partially within and under the actuating member 16.

Figure 4:
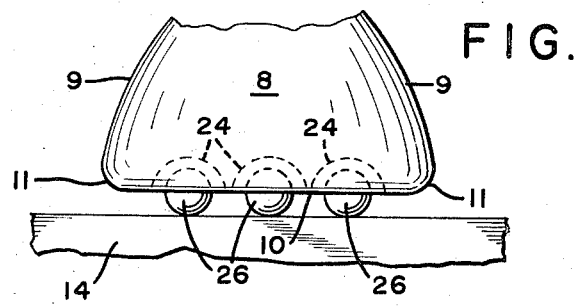
FIG. 4 is an enlarged view of a portion of the inertia member shown in FIGS. 1 and 2.
Figure 5:
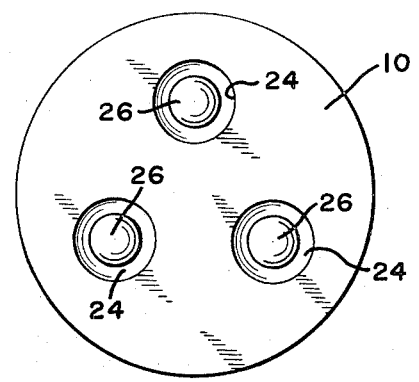
FIG. 5 is a bottom view of the inertia member shown in FIG. 4.

Referring to FIGS. 4 and 5, the inertia member 8 has a plurality of recesses 24 in the underside of its base 10. A plurality of balls 26 are rotatably positioned in the recesses 24. Preferably, the balls 26 and the inertia member 8 are made of stainless steel. One ball 26 is positioned in each recess 24 with a portion of each ball 26 extending below the plane of the base 10 of the inertia member 8. The balls 26 rest on the retaining platform 14 and support the inertia member 8 thereon. The inertia member 8 is adapted to roll on the retaining platform 14 in any direction by means of the movement of the balls 26. In this embodiment, three recesses 24 are provided and three balls 26. Other embodiments may use four, five or six recesses and balls. The closed base 10 structurally encloses the inertia member 8 at its bottom and provides a surface for the recesses 24.

Referring to FIGS. 1 and 2, the inertia member 8 moves on the balls 26, as a result of sudden acceleration, deceleration or sudden change of direction or orientation of the vehicle, from its central position on the retaining platform 14 to a position at or near the periphery of the retaining platform 14. Such movement of the inertia member 8 moves the actuating member 16, which moves the locking dog 22 into engagement with the ratchet wheel 6. Displacement of the inertia member 8 from its central position causes the locking dog 22 to engage the ratchet wheel 6 to restrain the safety belt against movement in the withdrawal direction. The locking mechanism 2 is thus vehicle sensitive because when the vehicle in which the locking mechanism 2 is positioned is subjected to a sudden acceleration or deceleration or change in direction or orientation of a predetermined magnitude, the locking mechanism 2 will be actuated.

Movement of the inertia member 8 from its central position, shown in FIG. 1, to a position at or near the outer periphery of the retaining platform 14, shown in FIG. 2, causes one side of the actuating member 16 to move upward and, as a result, causes the locking dog 22 to likewise move upward. The locking dog 22 pivots on pivot point 34. Upward movement of the locking dog 22, causes the locking dog 22 to engage an outer ratchet tooth of ratchet wheel 6. In FIGS. 1 and 2, the counterclockwise direction of the ratchet wheel 6 is in the direction in which the ratchet wheel 6 turns when the safety belt is being withdrawn.

Figure 3:
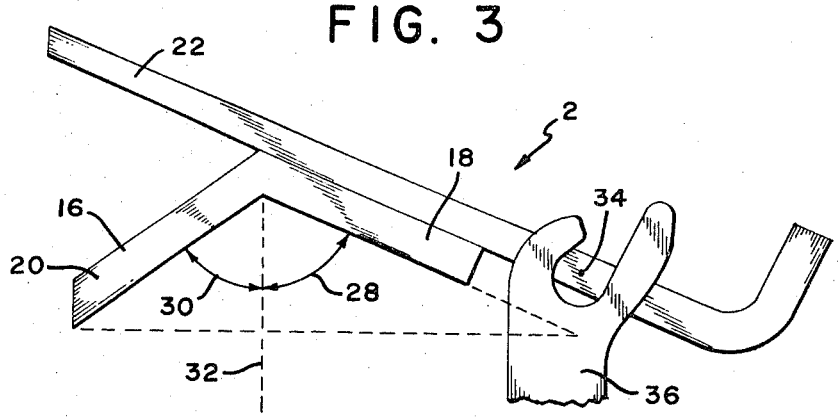
FIG. 3 is an enlarged schematic illustration of a portion of the locking mechanism shown in FIG. 1.

Referring to FIG. 3, the substantially conical member 16 is slightly tilted in reference to vertical plane 32 for the purpose of providing uniform sensitivity for the engaging action of the locking dog 22 to the ratchet wheel 6. Referring to FIGS. 1 and 2, the locking dog 22 is an elongated structural member and engages the ratchet wheel 6 at one end of the locking dog 22. The locking dog 22 has a pivot point 34 at the opposite end of the locking dog 22 from the end which engages the ratchet wheel 6. The pivot point 34 is part of a support member 36 which may be connected to retaining platform 14. Side 20 of conical member 16 is pitched at a greater slope than side 18 in order to give the same displacement of the locking dog 22 attached to the conical member 16 whether the inertia member moves toward or away from the pivot point 34.

Referring to FIG. 3, the angle 28 is formed by the side 18 of the substantially conical member 16 adjacent to the end of the locking dog 22 having pivot point 34 with the vertical plane 32. The angle 30 is formed by the side 20 of the substantially conical member 16 adjacent the end of the locking dog 22 which engages the ratchet wheel 6 with the vertical plane 32. Angle 28 is greater than angle 30 because of the tilt of the substantially conical member 16. Angle 30 may be an angle in the range of from 56° to 59°, such as 57.5°. Angle 28 may be an angle in the range of from 61° to 64°, such as 62.5°. These angle vary with the geometry of the system, that is, the relationship of the pivot point 34 of the locking dog 22 to the location and size of the inertia member 8. Optionally, the side 18 of the substantially conical member 16 adjacent to the end of the locking dog 22 having pivot point 34 may be slightly shorter than the side 20 of the substantially conical member 16 adjacent to the end of the locking dog 22 which engages the ratchet wheel 6.

The locking mechanism 2 has two substantially stable positions, a rest position, when the inertia member 8 is located in the approximate center of the retaining platform 14, which is illustrated in FIG. 1, and an engaged position, when the inertia member 8 is located at or near the periphery of the retaining platform 14, as illustrated in FIG. 2. When the vehicle in which the locking mechanism 2 is positioned is subjected to a sudden acceleration, deceleration, change in orientation (such as tilting or roll-over) or a change in direction of movement of a predetermined magnitude, the inertia member 8 will move from its rest position, shown in FIG. 1, to the engaged position, shown in FIG. 2. This provides a binary effect in which the inertia member 8 has a tendency to remain in one of two substantially stable positions, a rest position or an engaged position. This binary effect facilitates positive locking action of the seat belt retractor. The inertia member 8 returns to the rest position, in the approximate center of the retaining platform 14, as a result of the weight of the actuating member 16 and the locking dog 22 on the curved sides 9 of the inertia member 8.

The inertia member 8 will move in a direction opposite to that of the vehicle. If the vehicle accelerates, the inertia member 8 will move in a direction toward the back of the vehicle. If the vehicle decelerates, the inertia member 8 will move in a direction toward the front of the vehicle. If the vehicle turns to the right, the inertia member 8 will move to the left. If the vehicle turns to the left, the inertia member 8 will move to the right.

The inertia member 8 of this invention, having a substantially conical shape and moving on a plurality of balls 26, provides a significant advantage over other designs, such as an inertia member in the shape of a sphere which rolls directly on the retaining platform 14 without the use of a plurality of balls 26. The inertia member 8 of this invention is more responsive to acceleration, deceleration or change in orientation or direction of movement of the vehicle. The inertia member 8 of this invention experiences less frictional drag in rolling on the retaining platform 14. As a result, the inertia member 8 of this invention responds more quickly and responds to a somewhat smaller increment of acceleration, deceleration or change in orientation or direction of movement of the vehicle. This advantage is significant because it facilitates faster locking action of the seat belt retractor and will further reduce the risk of injury to the user of a seat belt equipped with this locking mechanism.

I claim:

1. A locking mechanism operated by inertia and adapted for use with a safety belt having a withdrawal direction and a retracting direction, said safety belt being adapted to be wound around a reel having a ratchet wheel, said locking mechanism comprising:
   a. a substantially conical inertia member having a base and an apex, said inertia member being adapted to be disposed in a central position when said locking mechanism is not in operation and adapted to be displaced from said central position by inertia;
   b. a retaining platform for said inertia member, said inertia member being supported on said retaining platform;
   c. a substantially conical actuating member having an apex and an open bottom, said actuating member being disposed above said inertia member and centered over said central position of said inertia member;
   d. a locking dog affixed to said actuating member, whereby displacement of said inertia member from said central position causes movement of said actuating member and said locking dog to restrain said safety belt against movement in the withdrawal direction; and
   e. said inertia member further comprising a plurality of recesses in the base of the inertia member and a plurality of balls rotatably positioned in said recesses, said balls resting on said retaining platform and supporting said inertia member thereon, said inertia member being adapted to roll on said retaining platform by means of the rotatable balls.

2. The locking mechanism according to claim 1 wherein the angle formed by the sides of said actuating member at its apex is greater than the angle formed by the sides of said inertia member at its apex.

3. The locking mechanism according to claim 1 wherein said locking dog engages said ratchet wheel at one of its ends and has a pivot point at its other end.

4. The locking mechanism according to claim 3 wherein said actuating member is slightly tilted, thereby providing uniform sensitivity to the engaging action of the locking dog to the ratchet wheel.

5. The locking mechanism according to claim 4 wherein the angle formed by the side of said actuating member adjacent the pivoting end of said locking dog with the vertical plane is greater than the angle formed by the side of said actuating member adjacent the engaging end of said locking dog with the vertical plane.

6. The locking mechanism according to claim 1 wherein said inertia member has a closed base structurally enclosing the inertia member at its bottom and providing a surface for said recesses; and wherein said actuating member is in contact with said inertia member.

7. The locking mechanism according to claim 4 wherein the side of said actuating member adjacent to the pivoting end of said locking dog is slightly shorter than the side of said actuating member adjacent to the engaging end of said locking dog.

8. A locking mechanism operated by inertia and adapted for use with a safety belt, said safety belt having a withdrawal direction and a retracting direction, said safety belt being adapted to be wound around a reel having a ratchet wheel, said locking mechanism comprising:
   a. an inertia member having a substantially conical shape, a base and an apex, said inertia member being adapted to be disposed in a central position when said locking mechanism is not in operation and adapted to be displaced from said central position by inertia;
   b. a retaining platform for said inertia member, said inertia member being supported on said retaining platform, said platform having upturned sides, said inertia member having two substantially stable positions, a rest position when said inertia member is located in the approximate center of said retaining platform, and an engaged position when said inertia member is located at or near the periphery of said retaining platform;
   c. a substantially conical actuating member disposed above said inertia member, centered over said central rest position of said inertia member, said actuating member having an open bottom, being slightly tilted, and being in contact with said inertia member;
   d. a locking dog affixed to said actuating member, whereby displacement of said inertia member from said rest position causes said locking dog to restrain said safety belt against movement in the withdrawal direction, said locking dog engaging said ratchet wheel at one of its ends and having a pivot point at its other end, the angle formed by the side of said actuating member adjacent the pivoting end of said locking dog with the vertical plane being greater than the angle formed by the side of said actuating member adjacent the engaging end of said locking dog with the vertical plane, thereby providing uniform sensitivity to the engaging action of the locking dog to the ratchet wheel;
   e. said inertia member further comprising a plurality of recesses in the base of the inertia member and a plurality of balls rotatably positioned in said recesses, said balls resting on said retaining platform and supporting said inertia member thereon, said inertia member being adapted to roll on said retaining platform in any direction by means of said rotatable balls.

* * * * *